Oct. 15, 1940.    W. S. GRAHAM    2,217,900
TRACTOR ATTACHED IMPLEMENT
Filed Oct. 8, 1939    3 Sheets-Sheet 1

Inventor
W. S. Graham
By V. F. Lasagne
Att'y.

Oct. 15, 1940.  W. S. GRAHAM  2,217,900
TRACTOR ATTACHED IMPLEMENT
Filed Oct. 8, 1938  3 Sheets-Sheet 2

Inventor
W. S. Graham
By [signature]
Att'y.

Oct. 15, 1940.  W. S. GRAHAM  2,217,900
TRACTOR ATTACHED IMPLEMENT
Filed Oct. 8, 1938  3 Sheets-Sheet 3
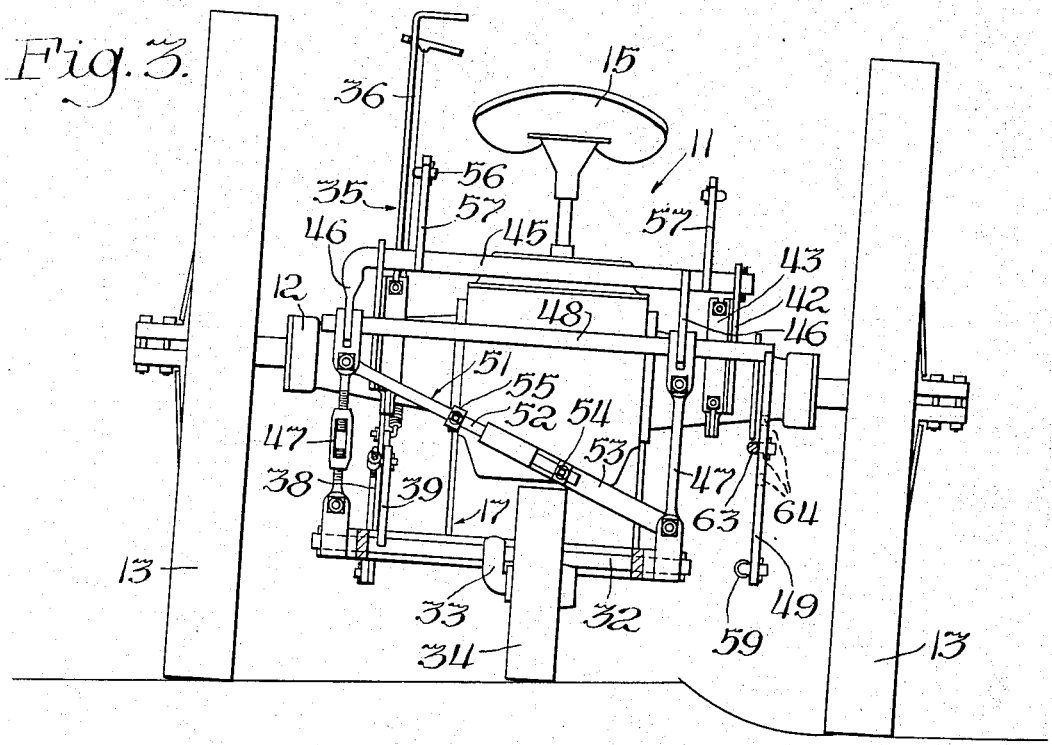
Inventor
W. S. Graham Patented Oct. 15, 1940

2,217,900

UNITED STATES PATENT OFFICE 2,217,900

TRACTOR ATTACHED IMPLEMENT

William S. Graham, Canton, Ill., assignor to International Harvester Company, a corporation of New Jersey Application October 8, 1938, Serial No. 233,969

12 Claims. (Cl. 97—47)

This invention relates to tractor attached implements and more particularly to implements of the type comprising two frames, one mounted for vertical movement on the tractor and the other supported at its rear by steerable wheel supporting means, and the two connected together for buckling movement in effecting adjustment of the tool carrying frame as the same is pivoted about the rear supporting means to lift the working tool from the ground.

The main object of the invention is to provide an implement of this type which is simple in design and layout and efficient in operation.

Another object of the invention is to provide a new arrangement of steerable connections between the tractor steering mechanism and the steerable implement supporting wheel.

Another object of the invention is to provide manual actuated means in the steering connections for obtaining independent control of the steerable implement wheel.

Another object of the invention is to provide means for properly alining the implement steerable means with the tractor steering mechanism.

In accomplishing these objects, there is provided a draft frame mounted for vertical movement on the tractor and a tool-carrying frame having a steerable rear supporting or furrow wheel and a gauge wheel which is mounted on the draft frame at the point of connection of the two frames connected to one another for buckling movement. This point of connection takes the form of a rotatable shaft to which also the swingable type of connecting links, forming a part of a lifting mechanism on the tractor, are connected. Upon operation of the lifting mechanism, these lifting links effect a buckling of the two frames and the tool-carrying frame is swung vertically about its rear supporting wheel. Also forming a part of the lifting mechanism and having a means for fastening the swingable links to a portion thereof is another rotatable shaft located substantially above the point of connection of the two frames on which there is an arm portion for the supporting of means for connecting the steering mechanism of the tractor and the steerable rear wheel, respectively. This arm means provides means whereby the ratio of the steering mechanism of the tractor relative to the effective steering of the rear implement wheel created thereby may be regulated as desired. In the linkage connecting the arm portion with the steerable rear implement wheel, there is provided a manual actuated means whereby adjustment of the rear implement wheel, independently of the tractor steering mechanism, may be effected. In addition to these adjusting means, just mentioned, the respective connecting linkages between the pivotal arms are each adjustable to change their effective length.

For a better understanding of the invention reference may be had to the following detailed description taken in connection with the accompanying drawings: in which, Figure 1 is an elevational view of a tractor having a rear wheel removed and of the implement embodying the present invention attached thereto and arranged in ground working position;

Figure 3 is a rear end view of the tractor with one wheel in the furrow and showing the relative position of the gauge wheel therewith, and the lifting linkage as viewed along line 3—3 of Figure 1; and, Figure 4 is a detailed showing of a portion of the tractor steering mechanism at the point of attachment of the steering connections of the implement thereto.

Figure 1:
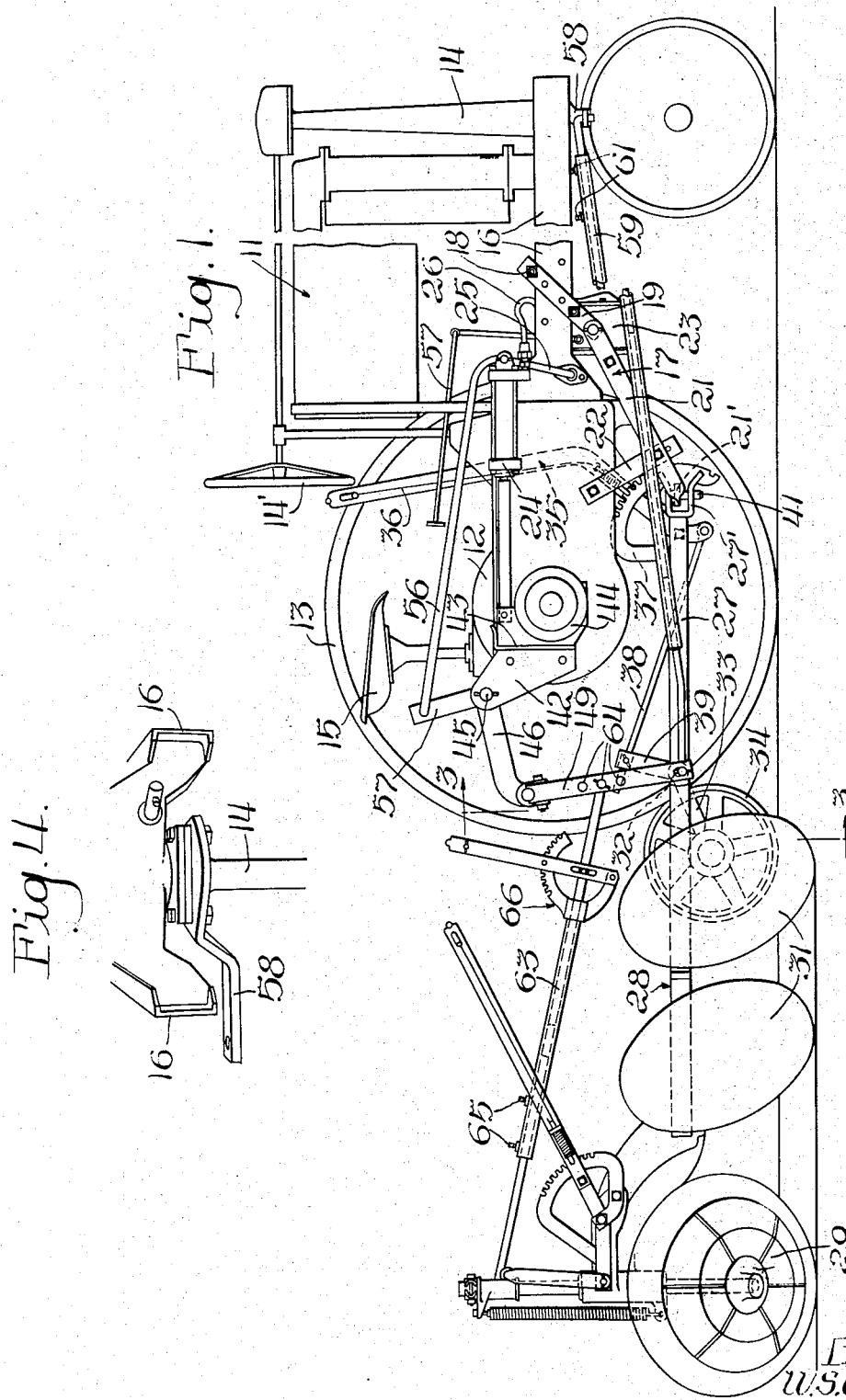
Figure 2:
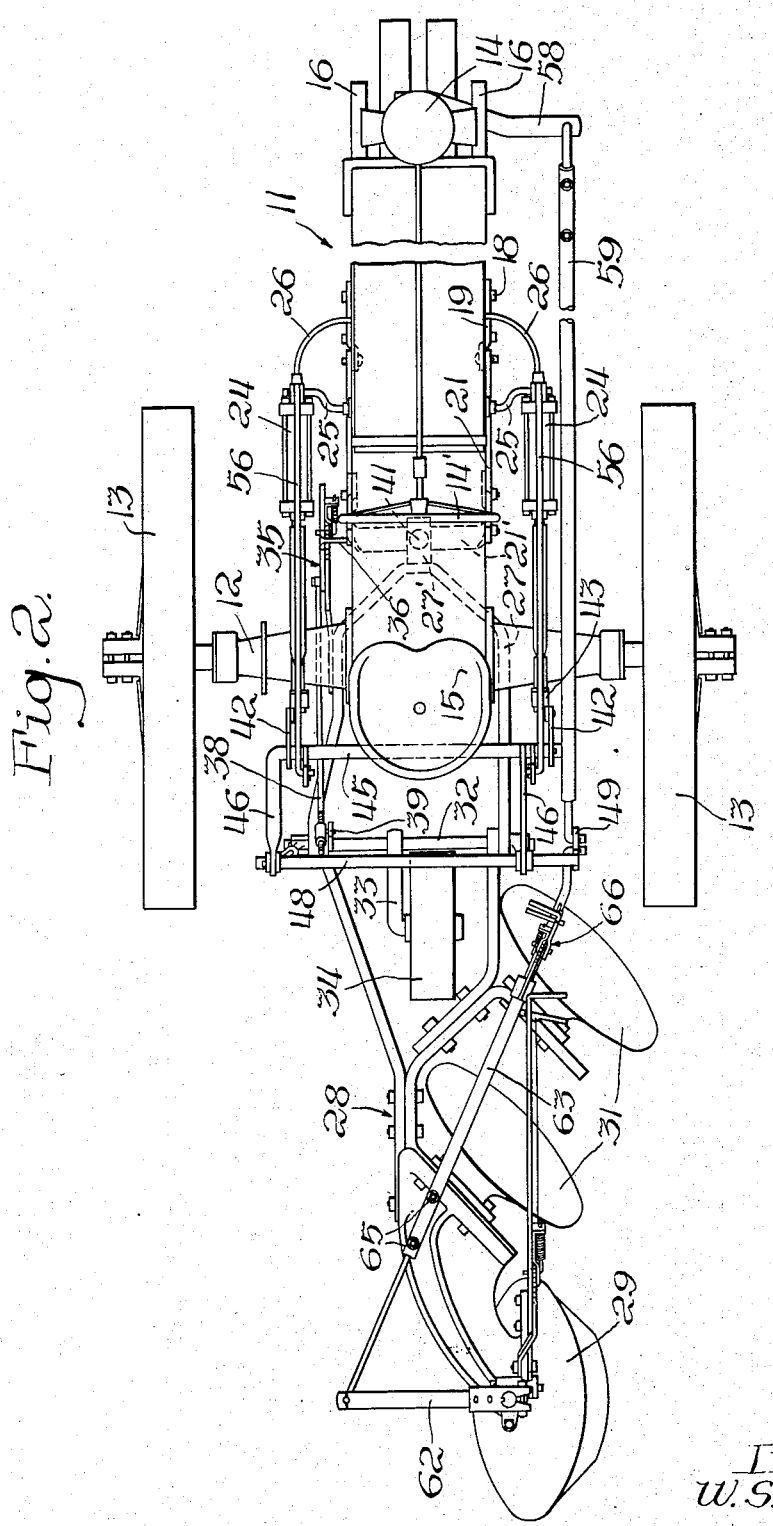
Figure 2 is a plan view of the arrangement shown in Figure 1 showing particularly the interconnecting steering means, as well as the location of the gauge wheel.

Referring now to the drawings, there is shown generally a tractor 11 having a rear axle housing 12, rear wheels 13 and a forward steering mechanism indicated generally at 14 and operable by means of a steering wheel 14' from an operator's station 15. The tractor also has side sills 16 to which may be attached a drawbar means 17 fastened by hook bolts 18 over the side sills and comprising two parts 19 and 21 angled with respect to each other in order to bring the portion 21' well under the tractor for the attachment of the implement. The member 21 is held in this location by straps 22 connected to the rear axle housing 12.

The tractor has a fluid pump and valve mechanism 23 located under the body of the tractor for supplying a fluid source to cylinder units 24 supported at each side of the tractor by having one end attached to the rear axle housing and the other to a swingable link 25 connected to the tractor forwardly thereof. This fluid source is supplied through fluid connections 26 serving to extend the cylinder piston unit 24 in a fore and aft direction.

The implement comprises a draft frame 27, an implement frame 28 having thereon a steerable furrow wheel supporting means 29 and working tools 31, and these frames pivotally connected together for buckling movement. This pivotal connection may be said to form a part of the draft frame 27 in the provision of a rotatable shaft 32 on which there is fixed an arm 33 carrying a gauge wheel 34. Manual control of this gauge wheel to alter the depth of cut of the working tools 31 is provided by manually actuated means 35 comprising a lever 36 and a quadrant 37 with an interconnecting rod 38 between the lower end of the lever 36 and an arm 39 on the rotatable shaft 32.

The draft frame 27 has provision for its connection with the drawbar means 17 at the point of connection 21' comprising an enlarged U-shaped portion 27' adapted to fit about the portion 21' and connected therewith by a pin 41. Removal of this pin 41 will permit detaching of the implement.

In order to effect raising and lowering of the working tools, there is provided linkage which may be quickly attached to the rear axle housing 12 of the tractor and when taken with the cylinder piston units 24 forms the lifting mechanism. This attachment structure comprises a rearwardly extending bracket portion 42 having quick attachable means 43 adapted to be associated with and connected to plate means 44 on the rear axle housing, all in a manner well known in the art. On this bracket, is a transverse extending rock-shaft 45 having rearwardly over-hanging lifting arms 46 to which are attached links 47 of the type which will permit lateral or swinging movement of the implement in all directions (see Figure 3). The means for connecting these links to the arms takes the form of a rotatable shaft 48 extending transversely of the tractor through the ends of the links and of the overhanging arms, and extending to a distance at the right side of the tractor intermediate of the implement and the right rear wheel to permit rigid connection thereto of a downwardly extending arm 49, the function of which is to be later described. The extending arm 49 taken with rotatable shaft 48 constitutes a pivotal means.

The lower ends of the links 47 are attached to the rotatable shaft 32 of the draft frame 27. To limit the swinging movement of these links, there is provided a diagonal means 51 comprising two relatively slidable members 52 and 53. On this member 52 are stop members 54 and 55, whereby the amount of lateral or swinging movement may be adjusted to within limits determined by their position on the member 52. By adjustment of the stop member within narrow limits and permitting less swinging movement, the steering of the implement steerable means by the tractor steering mechanism is made more effective upon backing up or upon turning of the tractor with the implement attached. Also the adjustment is available to obtain the best efficiency of the forward working operation of the arrangement.

It should now be seen that by using the rotatable shaft 32 as a means for connecting the two frames, a very satisfactory means is provided wherein the same may carry the gauge wheel and as well serve as a means for the connection of the swingable links 47. All of this lends itself to simplicity of construction in accordance with one of the objects of the invention.

The rock-shaft 45 will be rocked by means of the units 24 through a connection member 56 connected to an arm 57 on the rock-shaft 45. The units 24 are put into operation by a hand actuating mechanism 57 for the operation of the fluid valve and pump mechanism 32. When the units 24 are extended, the two frames 27 and 28 will pull with respect to each other by the pull of the swinging links 47 on the shaft 32, thereby elevating the tools 31 about the rear wheel 29. By virtue of the swingable links, the implement, particularly when in its ground working position, has free floating movement and is thus adaptable to follow the previously plowed furrows.

In order to be assured of satisfactory plowing, the furrow wheel 29 is connected to be steered by the steering mechanism 14 of the tractor. This steering mechanism has an arm 58, Figure 4, extending laterally to the right of the tractor and is connected with the lower end of the arm portion 49 by a link connecting means 59 adapted to be adjustable with respect to these two points of connection to vary the effective length of the same. This link connection 59 preferably takes the form of telescoping rods and has adjusting screws 61 to permit adjustment of the rods relative to each other. Connected to the furrow wheel 29 is a laterally extending arm 62 having a connecting linkage 63 with the arm portion 49 at another point thereon. The arm 49 has a series of holes 64 at which point this connecting linkage 63 may be located, dependent upon the ratio of adjustment for the amount of turning of the furrow wheel in either direction with respect to a given amount of turning of the tractor steering mechanism. Furthermore the pivotal means provide for a support for the interconnecting linkage positioned intermediate of the tractor steering mechanism and the implement steerable means. This linkage 63 is similar to the linkage 59 in that parts thereof are telescoping and may be given initial adjustment by the adjusting screws 65 to aline the implement steerable means with the tractor steering mechanism.

There is associated with this linkage 63, a quadrant and lever means 66 for the purpose of effecting independent manual operation or actuation of the furrow wheel with respect to the interconnecting mechanism and the tractor steering mechanism. Normally the ratio of turning effected by the turning of the tractor steering mechanism and the rear furrow wheel of the implement is a result of the steering of the rear furrow wheel between 60 and 80% of that of the tractor steering mechanism; for example an eighth turning of the tractor steering wheels would only effect between 60 and 80% of an eighth of a turning of the rear furrow wheel. During plowing only the minimum turning of the furrow wheel and less sensitivity of the steering mechanism connected with the tractor steering is desired. However, upon backing or turning of the tractor, a great ratio of turning of the furrow wheel with the tractor steering wheels is desired.

The manual mechanism 66 provides means which will assist in turning and backing of the tractor in that by operation of the same, the rear furrow wheel will be given a greater lead than it has in its normal setting. This manual mechanism is so arranged as to work from a middle point to adjust the rear furrow wheel a desired amount in either direction. Also, by this manual means, a quick adjustment may be given to give the rear furrow wheel more angle such as when the plow is being operated on side hills and there is a tendency for the same to drift. Under such conditions the operator necessarily has to keep the tractor steering wheels well angled and likewise it is necessary that the implement furrow wheel be kept well angled.

It should now be seen that by the general arrangement of the parts that there has been provided an implement of this type which is simple in construction and efficient in operation. While various changes may be made in the detailed construction, it is to be understood that these changes are made without departing from the spirit and scope of the present invention as defined by the appended claims.

What is claimed is:

1. In combination, a tractor, an implement attachment comprising a draft frame connected to the tractor for vertical movement, a tool-carrying frame having ground working tools thereon, ground supporting means for the rear of the tool-carrying frame, means for connecting the front of the tool-carrying frame with the draft frame to have free buckling movement with respect thereto in the ground working position, gauge wheel means for regulating the working depth of the working tools carried by the means for connecting the two frames, and means for lifting the working tools to and from their ground working position about the ground supporting means.

2. In combination, a tractor, an implement attachment comprising a draft frame connected to the tractor for vertical movement, a tool-carrying frame having ground working tools thereon, ground supporting means for the rear of the tool-carrying frame, one of the frames including means for connecting the front of the tool-carrying frame with the draft frame to have free buckling movement with respect thereto in the ground working position, gauge means for regulating the working depth of the working tools carried by one of the frames in the location of the connecting means, and means for lifting the working tools to and from their ground working position about the ground supporting means.

3. In combination, a tractor, an implement attachment comprising a draft frame connected to the tractor for vertical movement, a tool-carrying frame having ground working tools thereon, ground supporting means for the rear of the tool-carrying frame, said draft frame including means for connecting the front of the tool-carrying frame with the draft frame to have free buckling movement with respect thereto in the ground working position, gauge wheel means for regulating the working depth of the working tools connected to the draft frame, and means for lifting the working tools to and from their ground working position about the ground supporting means.

4. In combination, a tractor, an implement attachment comprising a draft frame connected to the tractor for vertical movement, a tool-carrying frame having ground working tools thereon, ground supporting means for the rear of the tool-carrying frame, said draft frame including means for connecting the front of the tool-carrying frame to the draft frame to provide free pivotal movement with respect thereto in the ground working position, gauge wheel means carried by the connecting means of the draft frame and adjustable to regulate the working depth of the working tools, and means for lifting the working tools to and from their ground working position about the ground supporting means.

5. In combination, a tractor, an implement attachment comprising a draft frame connected to the tractor for vertical movement, a tool-carrying frame having ground working tools thereon, ground supporting means for the rear of the tool-carrying frame, said draft frame including a rotatable shaft for connecting the front of the tool-carrying frame to the draft frame for buckling movement with respect thereto, an arm on said rotatable shaft, a gauge wheel mounted on said arm, a manually actuable means for rotating said shaft to effect regulation of the working depth of the working tools, and means for adjusting the working tools to and from their ground working position.

6. In combination, a tractor, an implement attachment comprising a draft frame connected to the tractor for swinging movement, a tool-carrying frame having ground working tools thereon, ground supporting means for the rear of the tool-carrying frame, said draft frame including means for connecting the front of the carrying frame to the draft frame for buckling movement with respect thereto, gauge wheel means connected to the draft frame, lifting means carried by the tractor, and means swingably connecting the lifting means with the front connecting means on the draft frame.

7. In combination, a tractor, an implement attachment comprising a draft frame connected to the tractor for swinging movement, a tool-carrying frame having ground working tools thereon, ground supporting means for the rear of the tool-carrying frame, said draft frame including a rotatable shaft for connecting the front of the tool-carrying frame to the draft frame for buckling movement, gauge wheel means mounted on the rotatable shaft, lifting means carried by the tractor, and means swingably connecting the lifting means with the rotatable shaft.

8. In combination, a tractor having a steering mechanism, an implement closely connected to the tractor and having a steerable means, means connecting the implement steerable means with the tractor steering mechanism to be actuated thereby comprising pivotal means positioned intermediate the tractor steering mechanism and the implement steerable means, means connecting the tractor steering mechanism with the pivotal means, means connecting the implement steerable means with the pivotal means, and manually actuated means associated with said latter connecting means to obtain control of the implement steerable means independently of the tractor steering means.

9. In combination, a tractor having a steering mechanism, an implement closely connected to the tractor and having a steerable means, means connecting the implement steerable means with the tractor steering mechanism, and manually operable means associated with said said connecting means to obtain control of the implement steerable means independently of the tractor steering mechanism.

10. In combination, a tractor having a steering mechanism, an implement closely connected to the tractor for movement with respect thereto and having a steerable means, lifting means on the tractor, means for connecting the implement to the lifting means including a rotatable part having an arm secured thereto, means for connecting the tractor steering mechanism with the arm, and means for connecting the implement steerable means with the arm.

11. In combination, a tractor having a steering mechanism, an implement attachment comprising a draft frame connected to the tractor for vertical movement, a tool-carrying frame, steerable ground supporting means at the rear of the tool-carrying frame, said draft frame including a rotatable shaft for connecting the front of the tool-carrying frame with the draft frame to have buckling movement with respect thereto, lifting means on the tractor including over-hanging arms, swingable link connections between said rotatable shaft and said arms including a rotatable part having an arm portion, means for connecting the tractor steering mechanism with the arm portion, and means for connecting the implement steerable means with the arm portion.

12. In combination, a tractor, an implement attachment of the type having a steerable supporting means, means for connecting the implement to the tractor for swinging movement, and adjustable means associated with the connecting means for limiting the swinging movement, whereby the implement steerable means may be made effective for backing up and for turning of the tractor with the implement attached.

WILLIAM S. GRAHAM.